Jan. 22, 1963 W. P. MICHELL ETAL 3,074,524
AUTOMATIC CLUTCH CONTROL SYSTEM
Filed June 24, 1958 2 Sheets-Sheet 1
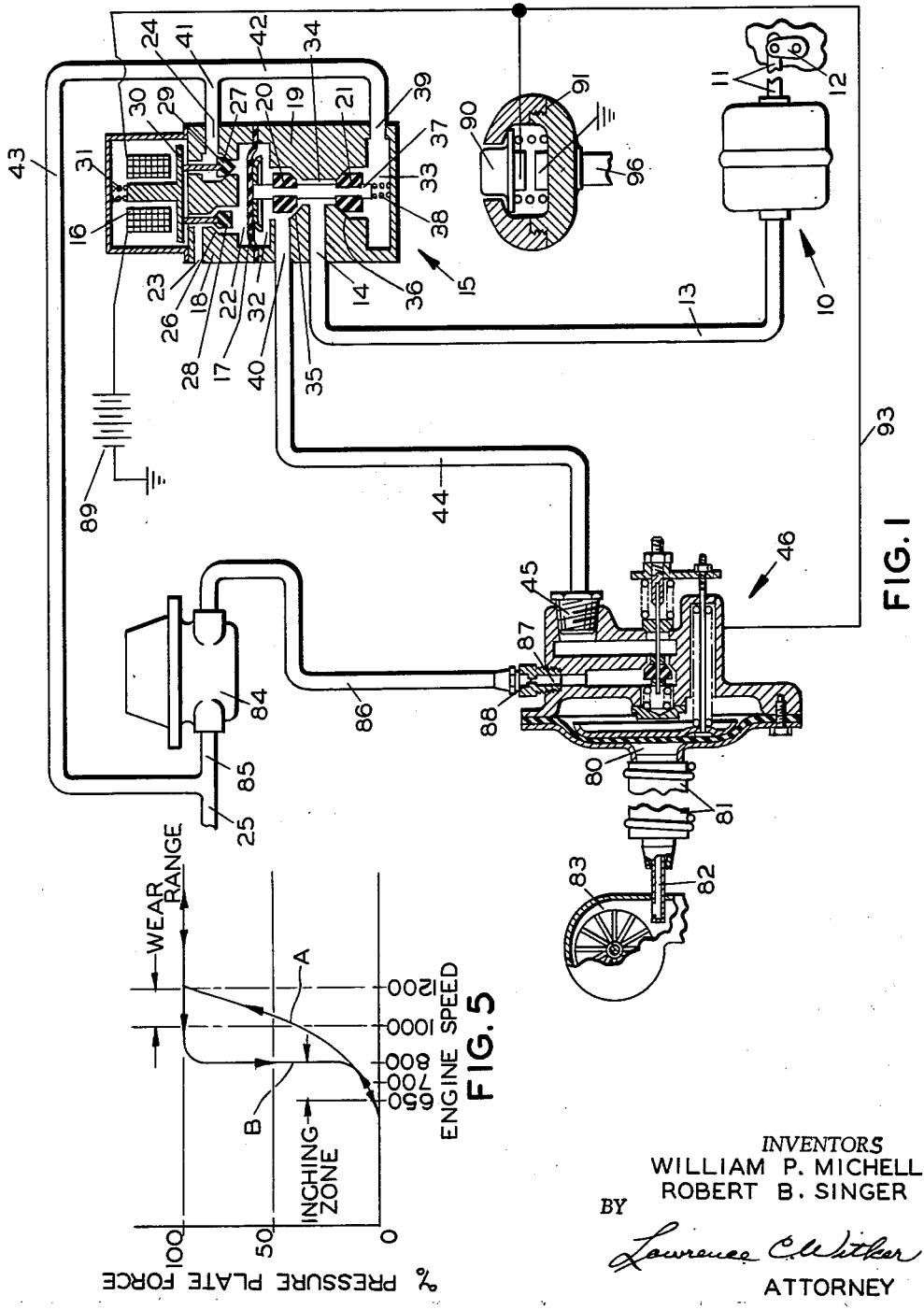
INVENTORS
WILLIAM P. MICHELL
ROBERT B. SINGER
BY
Lawrence C. Witker
ATTORNEY Jan. 22, 1963  W. P. MICHELL ETAL  3,074,524
AUTOMATIC CLUTCH CONTROL SYSTEM
Filed June 24, 1958  2 Sheets-Sheet 2
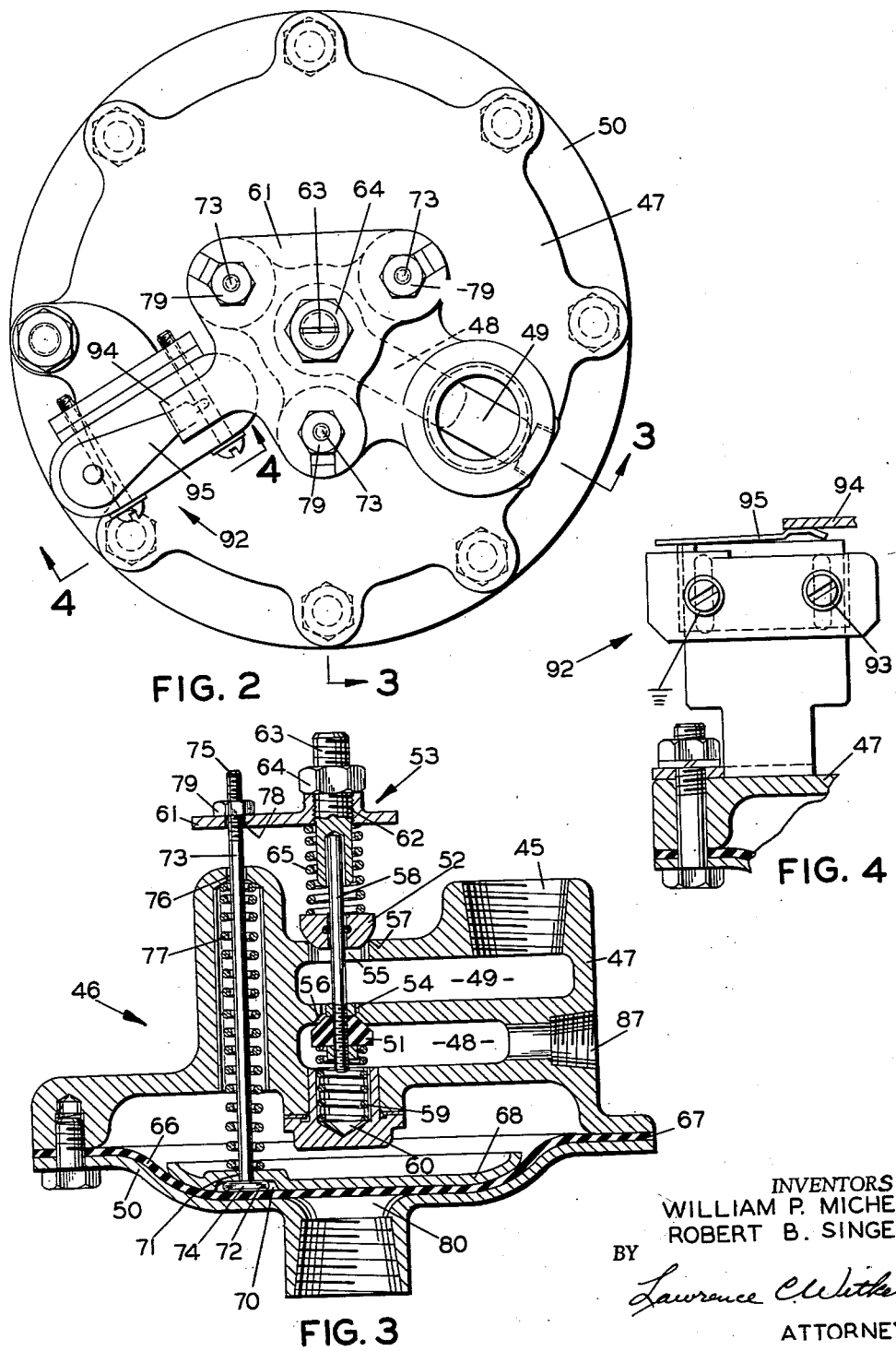
INVENTORS
WILLIAM P. MICHELL
ROBERT B. SINGER
BY
Lawrence C. Wither
ATTORNEY United States Patent Office 3,074,524
Patented Jan. 22, 1963

3,074,524
AUTOMATIC CLUTCH CONTROL SYSTEM
William P. Michell, Toledo, and Robert B. Singer, Sylvania, Ohio, assignors to Dana Corporation, Toledo, Ohio, a corporation of Virginia
Filed June 24, 1958, Ser. No. 744,285
5 Claims. (Cl. 192—103)

This invention relates to automatic clutch control systems in general, and is particularly directed to automatic clutch control systems of the character suitable for the progressive engagement or disengagement of a friction clutch of an automotive vehicle wherein the clutch is automatically disengaged when the speed of the engine is relatively low, that is, at or below idling speed.

Accordingly, it is the primary object of this invention to provide power means operated by fluid pressure means, the fluid pressure means being variably regulated by automatic means for effecting a clutch plate loading or unloading operation by the power means, the degree of loading or unloading being dependent upon means, such as the engine water pump, operative in accordance with the speed of the vehicle engine; means being provided for manually diverting the fluid pressure normally flowing to the power means through the automatic regulating means, directly to the power means to effect an instantaneous clutch plate unloading operation by the power means.

Further objects and advantages will become apparent upon reading the following specification together with the accompanying drawings which form a part hereof.

In the drawings:

FIG. 1 is a diagrammatical view disclosing a clutch control system embodying the invention;

FIG. 2 is a plan view of the automatic clutch apply valve constituting the principal feature of this invention;

FIG. 3 is a longitudinal sectional view taken along line 3—3 of the automatic clutch apply valve, shown in FIG. 2;

FIG. 4 is a view taken along line 4—4 of FIG. 2 showing the automatically actuated electrical switch located on the automatic clutch apply valve;

FIG. 5 is a diagram showing how the device shown in FIG. 1 may be operated to vary the degree of engagement and disengagement of the driving and driven members of the friction clutch during its automatic operational cycle.

The theory of automatic starting is old, having been perfected in so-called "centrifugal clutches." The friction surfaces of these clutches, however, are loaded only by centrifugal force. On the descending part of the speed cycle the centrifugal clutch unloads and slips at almost the same speed it ceases to slip on the ascending speed part of the cycle. This causes the clutch to wear and burn excessively.

The present device simulates a centrifugal clutch in its operational characteristics. However, the simulated centrifugal signal used in this device is the engine speed, whose signal source is the water velocity pressure taken from the tip of the engine water pump vanes. This velocity pressure is purely an engine speed responsive pressure, and is not affected by the thermostat opening of the engine cooling system.

Generally, the invention is incorporated for use in an automotive vehicle having an engine, a change speed transmission, and a spring engaged friction clutch, including a driving member and a driven member, for clutching or declutching the change speed transmission to the engine. The friction clutch is disengaged while the engine is idling and automatically engaged when the engine is accelerated, the degree of clutch engagement or disengagement being dependent upon the speed of the engine.

The system for controlling such a friction clutch is a fluid pressure operated, progressive type of power control comprising a single acting, fluid pressure actuated power means or servo-motor and linkage, capable of releasing the aforesaid friction clutch; an automatic clutch apply valve for variably regulating the fluid pressure between predetermined limits in the servo-motor, further means being provided for regulating the fluid pressure to the apply valve at a predetermined value. A three-way valve mechanism is also provided for diverting the fluid pressure directly to the servo-motor from its normally regulated path to the servo-motor, thereby connecting the said servo-motor directly to the said fluid pressure source, the means for actuating the three-way valve preferably including a solenoid.

The electrical control circuit for energizing the solenoid is preferably actuated by a pair of means, one of said means is a normally open, manually operated switch and is located in the knob of the conventional gear shift lever for the operator's convenience. The other said means is a normally open, automatically operated switch located on the automatic clutch apply valve and is operated by the mechanism thereof.

It will be obvious from the following description, that the excessive wear and burning of the friction clutch driven member will be overcome without giving up any of the smooth and desirable starts achieved by the old, purely centrifugal type clutches.

Referring now to the illustrated embodiment of this invention which is disclosed diagrammatically in FIG. 1, the principal elements thereof comprising a single acting, fluid pressure actuated servo-motor indicated generally by the reference numeral 10. The servo-motor 10 includes a power element or piston, not shown, connected to a spring engaged friction clutch, not shown. Such a clutch preferably, includes driving and driven friction members, either one of the said members being biased into engagement with the other member by the aforesaid spring means. The force transmitting means interconnecting the power element of the servo-motor 10 with the friction clutch preferably includes a piston rod 11 connected to a clutch operating crank 12. The increase of fluid pressure in the servo-motor 10 actuates the crank 12 thereby disengaging the friction clutch.

The servo-motor 10 is connected by a conduit 13 to the outlet port 14 of a control valve indicated as a whole by the reference numeral 15.

The control valve 15 is an electrically energized, three-way type, comprising a solenoid 16 for controlling a power element 17, an intermediate valve body 18 for housing the said power element 17, and a lower valve body 19 for housing the valve members 20 and 21.

The intermediate valve body 18 is provided with a power chamber 22, the outline thereof being a flexible diaphragm, constituting the power element 17 and the said valve body 18. Said valve body 18 includes a vent port 23 for venting the power chamber 22 to the atmosphere, and an inlet port 24 for communication with a fluid pressure source 25. The vent port 23 and the inlet port 24 are provided with seats 26 and 27 for engagement with valve members 28 and 29 respectively, which are secured to one end of an armature 30 of the solenoid 16 which is normally de-energized. When the solenoid 16 is energized, the valve members 28 and 29 move upwardly, seating valve member 28 in its seat 26, thereby cutting off the power chamber 22 from its vent port 23 to the atmosphere; the other valve member 29 being moved from its seat 27 puts the power chamber 22 into communication with the fluid pressure source 25. A spring 31 returns the armature 30 and the valve members 28 and 29 to their normal position when the solenoid 16 is de-energized, thereby cutting off the pressure from inlet port 24 and venting the power chamber 22 to the atmosphere.

The lower valve body 19 is provided with upper and lower compartments 32 and 33 respectively which are connected together by a duct 34. The upper compartment 32 being outlined by one side of the power element 17 and the valve body 19. The duct 34 is provided with a pair of seats 35 and 36 adapted to receive upper and lower valve members 20 and 21 respectively, which are secured to a valve rod 37. The valve rod 37 is in contact with the power element 17 at its one end and with a spring 38 at its opposite end. The power element 17 moves the valve members 20 and 21 in one direction only. With the power chamber 22 vented to the atmosphere, the spring 38 causes the lower valve member 21 to engage its seat 36, thereby cutting off the direct source of fluid pressure from the inlet port 39, which is in communication with the lower compartment 33. The upper valve member 20, being unseated, allows the combined inlet and exhaust port 40, which is connected to the upper compartment 32, to be in communication with the outlet port 14. With the solenoid 16 energized, the power element 17 moves downwardly, seating the upper valve member 20 and unseating the lower valve member 21, thereby putting the said inlet port 39 in communication with the outlet port 14.

The inlet port 24 of the power chamber 22 and the inlet port 39 of the lower compartment 33 are connected by conduits 41 and 42, which are connected by a common conduit 43 to the fluid pressure source 25, said fluid pressure can be either regulated or unregulated. The combined inlet and exhaust port 40 of the control valve 15 is connected by a conduit 44 to the outlet port 45 of a clutch apply valve, indicated generally by the reference numeral 46.

Referring now to FIGS. 2 and 3, the clutch apply valve 46 is essentially an automatically operated, variable regulating fluid pressure device and comprises generally, a valve housing 47 provided with fluid pressure inlet and outlet chambers 48 and 49 respectively, a valve housing cover 50, a pair of valve members 51 and 52 and valve operating mechanism which is indicated generally by the reference numeral 53.

The inlet and outlet chambers 48 and 49 of the housing 47 are located in spaced relationship at their inner ends, where orifices 54 and 55 are located in axial alignment interconnecting the chambers 48 and 49 and venting the outlet chamber 49 to the atmosphere. The orifices 54 and 55 are provided with seats 56 and 57 for receiving the valve members 51 and 52 which are axially aligned by a push rod 58.

One of the valve members 51 is located in the inlet chamber 48 and is fixedly secured to one end of the push rod 58 for movement therewith. A spring 59, is located in a pocket 60 provided in the inlet chamber 48, an end of which is in contact with the said valve member 51, and operates to engage the valve member 51 with its seat 56, whereby the inlet chamber 48 is cut off from the outlet chamber 49. The other valve member 52 is sleeved over the said push rod 58 for axial movement, in either direction, in relation thereto, and is located adjacent to and externally of the valve housing 47 over the orifice 55 for venting the outlet chamber 49 to the atmosphere.

An actuator plate 61, the function of which will be described later, is provided with a threaded hole 62 at its center and is located intermediate the ends of an adjusting screw 63. The adjusting screw 63 has a bore in its end portion to telescopically receive the opposite end of the push rod 58 for axial movement, in one direction only, therewith. A lock nut 64 is threaded on the outer extremity of the said adjusting screw 63 adjacent to the outer surface of the said actuator plate 61, whereby the screw 63 can be locked to the plate 61 in any desired setting.

A spring 65, with means for varying its weight is preferably sleeved over the end portion of the adjusting screw 63 which receives the telescoping end of the push rod 58. The spring 65 is located between and has its opposite ends in contact with the actuator plate 61 and the valve member 52, and operates to engage the valve member 52 with its seat 57, whereby the outlet chamber 49 can be closed to the atmosphere. The means for varying the weight of the spring 65 and its function will be described in detail hereinafter.

Describing now the automatic actuating mechanism of the clutch apply valve 46 and the means for interconnecting the said actuating mechanism to the valve operating mechanism 53; a chamber, the outline of which is the valve housing 47 and the inner surface 66 of a flexible diaphragm 67, contains a push plate 68 which is in direct contact with the diaphragm 67 is movable axially, in one direction only, by the movement of the diaphragm 67. The plate 68 is provided with a series of depressions 70 having openings 71 provided therein on its diaphragm contacting surface 72.

A plurality of pull rods 73 having heads 74 are pocketed in and protrude through the openings 71 and are retained therein by the heads 74 which are formed on one of their ends. The other ends 75 of the said pull rods 73 are threaded and extend beyond the valve housing 47, through openings 76 provided therein, for interconnecting the above described automatic actuating mechanism to the aforementioned actuator plate 61 of the valve operating mechanism 53.

A plurality of diaphragm springs 77 are preferably sleeved over the intermediate portions of the pull rods 73 contained within the valve housing 47, the springs 77 being located between and having their respective ends in contact with the push plate 68 and the valve housing 47. The springs 77 operate to keep the flexible diaphragm 67 at rest. The weight of the springs 77 is equivalent to the weight of the spring 65 plus the force being applied on the flexible diaphragm 67.

The actuator plate 61 is provided with a series of holes 78 around its outer periphery for slideably receiving the pull rods 73 intermediate their threaded ends 75. Stop nuts 79 are threaded on rods 73, and are located adjacent to the actuator plate 61 for cooperation therewith and the restraint thereof. The nuts 79 also serve to adjust the relative position of the actuator plate 61 in relation to the valve member 52, whereby the weight of the spring 65 can be adjusted.

Describing now the operation of the automatic actuating mechanism in conjunction with the valve operating mechanism 53 whereby changes of position, in either direction, of the flexible diaphragm 67, constituting the power element of the valve operating mechanism, increases or decreases the forces being applied to the valve members 51 and 52 by their respective springs 59 and 65. Movement of the diaphragm 67 upwardly in FIG. 3 by the increase of water pressure decreases the amount of force applied by the springs 59 and 65 against their respective valve members 51 and 52. The decrease in force against the valve member 52 tends to allow venting of the outlet chamber 49. The said venting condition being a function of the pressure in the said chamber 49 in relation to the opposing force of the said spring 65. The weight of the spring 59 being reduced thereby increases the force tending to engage the valve member 51 in its seat 56 whereby the fluid pressure in the outlet chamber 49 is gradually reduced or completely cut off from the incoming fluid pressure. Movement of the diaphragm 67, downwardly in FIG. 3, by the extending of the diaphragm springs 77 due to a decrease in water pressure, increases the forces being applied to the springs 59 and 65 thereby reversing the above described conditions.

It follows, therefore, that the automatic operation of the clutch apply valve 46 variably regulates the fluid pressure to the power element of the servo-motor 10, thereby controlling the degree of engagement or disengagement of the friction clutch plates. A power chamber 80, outlined by the opposite surface of the flexible diaphragm 67 and the valve housing cover 50, is provided for receiving a power fluid, preferably water, for actuating the flexible diaphragm 67. Referring now to FIG. 1, the power chamber 80 is connected by a conduit 81 to a pitot tube 82 which is located in the high pressure side of a water pump 83, preferably the engine driven water pump of the vehicle engine cooling system; and is adapted to transmit variations in pressure from the pump 83 to the chamber 80. The pressure in the pump 83 varies as a function of the engine speed. It follows, therefore, that the fluid within the power chamber 80 exerts a motivating pressure upon the diaphragm 67 which is proportional to the speed of the engine.

A fluid pressure regulator 84 is located between and is connected to the aforementioned source of fluid pressure 25 by a conduit 85 and a conduit 86 to the inlet port 87 of the apply valve 46 for supplying a constant value of fluid pressure thereto. The inlet port 87 is provided with a restricted orifice 88 whereby the fluid pressure is instantly available on the demand of the apply valve 46, and further functions to keep the fluid pressure loss to a minimum from the said apply valve 46 due to leakage during its operational cycle.

Describing now one of the features of this invention, the previously described control valve 15 is actuated by the solenoid 16 which is controlled by electrical means as disclosed in FIG. 1. Describing this circuit, a grounded battery 89 is wired in series with the solenoid 16, and a grounded, manually operated, normally open switch 90 energizes the electrical circuit and is preferably mounted in the knob 91 of a gear shift lever 96 for the convenience of the vehicle operator.

With the vehicle travelling in gear it is desirable to automatically disengage the friction clutch when the vehicle is stopped suddenly. To effect this automatic operation of the mechanism, there is provided another grounded, normally open, electrical switch 92 wired in parallel with the aforedescribed switch 90 by a wire 93. The switch 92 is located on the valve housing 47 of the clutch apply valve 46, see FIGS. 2 and 4, whereby a finger 94 protruding from the aforementioned actuator plate 61 is contactable with a switch operating member 95. The switch 92 is automatically closed by the aforesaid device when the vehicle engine is not running. The finger 94 is located to contact and close the switch operating member 95 at a predetermined engine operating speed. This operating speed is lower than the engine idling speed and higher than the engine stall speed. When the switch 92 is closed, the solenoid 16 of the control valve 15 is energized and communicates the servo-motor 10 directly with the source of fluid pressure 25 through the conduits 13 and 43 thereby effecting a prompt disengagement of the friction clutch. Thus, the closing of the switch 92 will effect an instant disengagement of the friction clutch as aforedescribed.

The following disclosure will be of a typical operation of the mechanisms constituting this invention and any parts not heretofore described. For the purposes of the following discussion, definite values of fluid pressure and their corresponding degree of clutch engagement in percent force, see FIG. 5, will be assumed for a vehicle incorporating the mechanisms of this invention. With reference to this figure, the curve A shows the clutch engaging operation, and curve B the clutch disengaging operation of this assumed vehicle.

The engine of the vehicle must be started with the transmission in neutral, as the friction clutch is normally engaged in the absence of fluid pressure in the clutch control system. With the throttle completely released, thereby operating the engine at its idle speed, the water pressure in the power chamber 80 of the clutch apply valve 46 is such that the diaphragm 67 is moved to an intermediate position, thereby allowing the actuator plate 61 to move and open the electrical switch 92. The flow of fluid pressure, therefore, is communicated from the clutch apply valve 46 to the servo-motor 10. The diaphragm springs 77 are strong enough to retain the flexible diaphragm 67 in this intermediate position whereby the pull rods 73 and the push rod 58 cooperate to keep the valve member 51 open. The diaphragm springs 77 also apply enough load through the pull rods 73 and the actuator plate 61 to the spring 65 so that the valve member 52 is tightly sealed in its seat 57 and holds against the 75 p.s.i. fluid pressure which has been admitted through the orifice 54 from the fluid pressure regulator 84. The flow of fluid pressure into the servo-motor 10 is from the fluid pressure regulator 84 through the clutch apply valve 46 and the control valve 15. When the fluid pressure reaches a value of 75 p.s.i. the friction clutch disengages, so that a starting gear ratio may be selected.

The vehicle engine is now prepared to effect a forward or reverse movement of the vehicle as desired. Accordingly, the vehicle operator increases the throttle opening to effect a friction clutch engaging operation through the clutch apply valve 46 thereby operating the power element of the servo-motor 10.

Describing now the latter operation with the first increment of movement of the throttle opening. The resulting speed increase of the vehicle engine is sensed by the diaphragm 67, of the clutch apply valve 46, in the form of force applied to the diaphragm springs 77. This deflection or movement of the diaphragm 67 allows the springs 65 to lose load in proportion to the engine speed. The valve member 52 pressure holding capacity is marginal in holding the aforesaid 75 p.s.i., its pressure holding capacity progressively reducing as its spring 65 is progressively unloaded, thereby allowing the fluid pressure from the servo-motor 10 to be exhausted at a controlled rate. During this same period the spring 59 begins to extend and tends to engage the valve member 51 with its seat 56. The apply valve 46 being in the above condition permits the pressure in the servo-motor 10 to decrease. At an engine speed of 700 r.p.m. the fluid pressure has decreased to about 60 p.s.i. and has weakened the servo-motor 10 enough to permit light torque transmission through the friction clutch. As the throttle opening is further advanced, the resulting increase of engine speed further depletes the fluid pressure remaining in the servo-motor 10, thereby allowing the clutch to transmit additional torque. At an engine speed of 800 r.p.m. the valve member 51 closes and the remaining entrapped fluid pressure in the servo-motor 10 is bled off at a controlled rate, to the atmosphere by the valve member 52. When an engine speed of 1,000 r.p.m. has been reached the clutch slip is zero as the value of the forces being transmitted by the fluid pressure is less than the value of force being transmitted by the clutch engaging means. When the engine speed has reached a pre-determined value of 1250 r.p.m., the servo-motor 10 is completely vented to the atmosphere by the spring 65 being completely unloaded.

From the above description it is to be seen that means are provided for varying the degree of loading of the friction clutch plates. It is also to be noted that the mechanisms of this invention are preferably so constructed that the clutch engaging operation is controlled by the vehicle engine during a relatively low range of engine speed.

With the vehicle travelling in gear and subsequent shifting of the transmission gearing is desired, the operator closes the switch 90 in the shift lever knob 91; accordingly, the solenoid 16 of the control valve 15 communicates the servo-motor 10 directly with the fluid pressure source 25, effecting a prompt disengagement of the friction clutch. Upon release of the switch 90 the control valve 15 diverts the flow of fluid pressure through the clutch apply valve 46 whereby the fluid pressure is exhausted to the atmosphere and effects a re-engagement of the clutch.

Continuing now with the descending part of the speed cycle, as the throttle is released the engine speed is reduced, whereby the diaphragm springs 77 sense a reduction of water pressure and begin to extend. The spring 65 begins to receive a load through the pull rods 73 and seats the valve member 52 into its seat 57. However, in the absence of a supply of fluid pressure, this condition alone does not build up enough fluid pressure to actuate the servo-motor 10. Hence, the friction clutch may be kept at full torque capacity until, by choice, the valve member 51 is pushed open, thereby admitting air to actuate the servo-motor 10. In the assumed vehicle, the valve member 51 is opened at a speed of 650 r.p.m., a speed low enough to make excessive clutch wear and burning very unlikely.

The actual operation of the above described mechanism is very smooth. Inching and maneuvering of the vehicle are done under an engine speed of 800 r.p.m. Once the speed of the engine has exceeded 1000 r.p.m., clutch slipping can occur only below 650 r.p.m., see FIG. 5.

When sudden stops of the vehicle are required, the water pressure from the engine cooling system is greatly reduced, causing the diaphragm 67 to move towards its position in the power chamber 80 when the engine is at its normal idling speed. At an engine speed which is lower than the engine idling speed, the diaphragm 67 will come to approximately a complete rest, whereby the valve operating mechanism 53 closes the switch 92 located on the valve housing 47 of the clutch apply valve 46 and effects an immediate disengagement of the friction clutch.

As can be seen from the foregoing description, there is thus provided, by the clutch control mechanism of this invention means for automatically engaging and disengaging the friction clutch while the vehicle is established in gear and travelling at a low rate of speed. In effecting this operation with the mechanism of this invention, the speed of the vehicle engine and the adjustment of the clutch apply valve 46 cooperate to effect a variable clutch plate loading operation.

The essence of this invention, however, lies in the means for controlling the degree of engagement of the friction clutch plates. There is thus provided a clutch control mechanism wherein the engagement of the clutch is directly proportional to the driving torque of the vehicle engine, thereby effecting the desired acceleration of the vehicle.

It will be obvious that various changes in the details, which has been herein described and illustrated in order to explain the nature of the invention, may be made by those skilled in the art within the principal and scope of the invention as expressed in the appended claims.

What is claimed is:

1. An automatic clutch control system adapted to be included in the power plant of an automotive vehicle for controlling a spring engaged clutch, the combination comprising a first fluid pressure system including a source of fluid pressure, clutch operating means, a single acting servo motor connected to said operating means and acted upon by the fluid pressure in said system, a pressure control device including a power chamber for controlling the pressure from the source of fluid pressure, fluid transmitting means connecting said control device with said servo motor, other fluid transmitting means connecting said control device to the source of fluid pressure; a second fluid pressure system independent of said first system including speed responsive means, fluid transmitting means connecting said speed responsive means with said power chamber, a power element in said power chamber acted upon by said speed responsive means; said pressure controlling device further including a housing having a pair of fluid transmitting chambers therein, means forming a duct interconnecting said chambers, a first movable element in one of said chambers for controlling the flow of fluid pressure through said duct, means defining a port venting the other chamber to the atmosphere, a second movable element cooperable with said port for controlling the flow of fluid pressure to the atmosphere, means operatively connecting said movable elements with said power element comprising a rod connected to the power element and extending through the housing, a plate slidably mounted on said rod, spring means engageable with said plate and said second movable element for urging the plate and said second element in opposite directions, another rod slidably engaging said plate at one of its extremities and connected to the first movable element at its other extremity, another spring means engageable with the first movable element for urging said first movable element toward said plate, whereby movement of the power element in one direction permits the first movable element to close the duct connecting the two chambers and decreases the spring force normally biasing the second movable element to close said atmospheric port, and movement of the power element in the opposite direction biases the first movable element in a direction to open the duct between the two chambers and increases the spring force urging said second movable element in a direction to close the port to the atmosphere.

2. A fluid pressure controlling device comprising a housing forming a power chamber having a power element positioned therein, means defining a pair of fluid transmitting chambers in said housing, means forming a duct interconnecting said fluid transmitting chambers, a first movable element in one of said fluid transmitting chambers for controlling the flow of fluid pressure through said duct, means forming a port venting the other of said fluid transmitting chambers to the atmosphere, a second movable element cooperable with said port for controlling the flow of fluid pressure to the atmosphere, means operatively connecting said movable elements with said power element comprising a rod connected to the power element, a plate mounted on said rod, spring means engageable with said plate and said second movable element for urging the plate and said second element in opposite directions, another rod slidably engaging said plate and connected to the first movable element, another spring means engageable with the first movable element for urging said first movable element toward said plate whereby movement of the power element in one direction permits the first movable element to close the duct connecting the power transmitting chambers and decreases the spring force normally biasing the second movable element to close the atmospheric port, and the movement of the power element in the opposite direction biases the first movable element in a direction to open the duct between the power transmitting chambers and increases the spring force urging said second movable element in a direction to close the port to the atmosphere.

3. A clutch control for use in a vehicle having an engine comprising a source of fluid pressure, fluid operated power means adapted to effect engagement and disengagement of a clutch, a first fluid transmitting means connecting said fluid source with said power means and having a speed responsive valve disposed therein to automatically effect engagement and disengagement of the clutch in response to engine speed, a second fluid transmitting means adapted to connect the fluid source with said fluid operated power means and including a valve controlling fluid flow through both said first and second fluid transmitting means, means controlling operation of said last named valve and including a manually operable switch, said switch being operable at the discretion of the operator at any vehicle speed to effect disengagement of the clutch.

4. A clutch control system for use in a vehicle having an engine comprising a source of fluid pressure, fluid operated power means adapted to effect disengagement of a clutch upon receipt of fluid pressure, fluid transmitting means connecting said power means with the fluid source, speed responsive means disposed in said fluid transmitting means and preventing fluid flow to said power means in response to a predetermined engine speed to effect engagement of the clutch, a second fluid transmitting means connecting the fluid source with said power means, valve means positioned in said first and second fluid transmitting means for controlling fluid flow to said power means, and manually operable means operatively connected to said valve means for controlling operation thereof and including a solenoid having a remotely disposed manually operable switch therefor, said switch being operable at the discretion of the operator at any vehicle speed to effect disengagement of the clutch.

5. A clutch control system for use in a vehicle having an engine comprising a source of fluid pressure, fluid operated power means adapted to effect disengagement of a clutch upon receipt of fluid pressure, fluid transmitting means connecting said power means with the fluid source, speed responsive means disposed in said fluid transmitting means and preventing fluid flow to said power means in response to a predetermined engine speed to effect engagement of the clutch, a second fluid transmitting means connecting the fluid source with said power means, valve means positioned in said first and second fluid transmitting means for controlling fluid flow to said power means, and manually operable means operatively connected to said valve means for controlling operation thereof, said manually operable means including an electric circuit having a valve operating solenoid disposed therein, a remotely positioned hand operated switch disposed in said circuit and being operable at the discretion of the operator at any vehicle speed to effect disengagement of the clutch.

References Cited in the file of this patent
UNITED STATES PATENTS

| | | |
|---|---|---|
| 2,153,509 | Rockwell | Apr. 4, 1939 |
| 2,408,638 | Hedgecock | Oct. 1, 1946 |
| 2,707,541 | Prather | May 3, 1955 |
| 2,759,584 | Brueder | Aug. 21, 1956 |
| 2,875,784 | Cole | Mar. 3, 1959 |